United States Patent [19]

Smitley

[11] 3,994,356
[45] Nov. 30, 1976

[54] SAFETY SHUT-OFF FUEL SYSTEM
[75] Inventor: Marion L. Smitley, Birmingham, Mich.
[73] Assignee: Colt Industries Operating Corporation, New York, N.Y.
[22] Filed: June 6, 1975
[21] Appl. No.: 584,580

[52] U.S. Cl. .............................. 180/82 R; 137/495; 180/103 BF; 417/507
[51] Int. Cl.² ................... B60K 15/08; B60K 28/00
[58] Field of Search ................ 180/82 R, 103, 104; 123/198 D, 198 DB; 137/38, 39, 494, 495, 469; 417/295, 506, 507, 559

[56] References Cited
UNITED STATES PATENTS

| | | | |
|---|---|---|---|
| 3,001,773 | 9/1961 | Johnson | 417/507 |
| 3,533,390 | 10/1970 | Goodwin | 123/198 DB |
| 3,550,717 | 12/1970 | Doty | 180/103 BF |
| 3,618,581 | 11/1971 | Simonet | 123/198 DB |
| 3,620,204 | 11/1971 | Baltadonis | 123/198 D |
| 3,810,489 | 5/1974 | MacManus | 137/495 |
| 3,907,060 | 9/1975 | Burton | 123/198 B X |

Primary Examiner—M. H. Wood, Jr.
Assistant Examiner—Terrance L. Siemens

[57] ABSTRACT

An automotive fuel system which has a fuel tank, a fuel pump, a fuel metering device for metering fuel flow to an associated fuel-consuming engine, and a fuel reservoir (such as, for example, a carburetor fuel bowl), has a valving assembly interposed generally between the outlet of the fuel pump and the fuel reservoir with such assembly being responsive to, for example, the associated vehicle experiencing a crash impact or a roll-over condition whereupon such valving assembly becomes effective to prevent the further flow of fuel from the fuel pump into the fuel reservoir.

12 Claims, 2 Drawing Figures

SAFETY SHUT-OFF FUEL SYSTEM

BACKGROUND OF THE INVENTION

Generally, automotive vehicles, whether automobiles, trucks or buses, have a relatively high degree of stability even in situations where they are struck from the side by another vehicle at a relatively high velocity. The stability and resistance to such struck vehicle turning over is due to such factors as the relatively heavy weight of the vehicle, its relatively low center of gravity as well as the relatively wide lateral wheel spacing. However, a very small percentage of such automotive vehicles involved in crashes do, nevertheless, turn or roll over or otherwise severely change their attitude from what would be considered normal.

It has, for many years, been accepted practice to, in automotive vehicles, provide a fuel tank from where a fuel pump would draw fuel and in turn supply such fuel to, for example, a fuel metering device on a remotely situated engine.

Often times such fuel metering devices take the form of a carburetor with an associated fuel bowl including a float-valve assembly therein. In many such arrangements there is a vent passage which in effect serves to complete communication as between the interior of the fuel bowl (above the fuel contained therein) and a source of ambient atmosphere as, for example, some point or area within and downstream of the engine intake air cleaner.

If the very small percentage of such automotive vehicles which do turn over, roll-over or otherwise severely change their attitude it has been found that a further small percentage thereof have had fuel spill out of the vent tube or passage (or other passages communicating with the engine intake system) and flow over the engine and associated structure. In such instances, after investigations, it has been determined that because of the particular physical attitude or position assumed by the struck vehicle the fuel tank may actually assume an elevation above that of the carburetor fuel bowl. Because of such a change in relative elevations the liquid pressure head of the fuel within the fuel tank becomes sufficient to cause fuel to flow through the fuel pump (even though the fuel pump may not be operating) and into the carburetor fuel bowl from where such fuel, as previously indicated, can spill over onto the engine and associated structure. Such spilled fuel can, in turn, under circumstances giving rise to such a condition, ignite with the resulting flames being capable of starting the entire vehicle to burn.

Even though the occurrence of such crash situations leading to such fuel-caused fires is rare, nevertheless, the invention as herein disclosed and described is directed to the solution of such as well as other attendent and related problems.

SUMMARY OF THE INVENTION

According to the invention, an automotive fuel system comprising a fuel tank, a fuel pump for pumping fuel from the tank to an associated fuel metering device which in turn meters fuel to an associated engine, has valving means effective for automatically preventing further fuel flow from the fuel tank and fuel pump to the associated fuel metering device upon the associated vehicle sustaining, for example, a crash impact or a severe change in its attitude as, for example, rolling over.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and elements may be omitted from one or more views.

DETAILED DESCRIPTION OF THE PREFERRED EMBODIMENT

Figure 1:
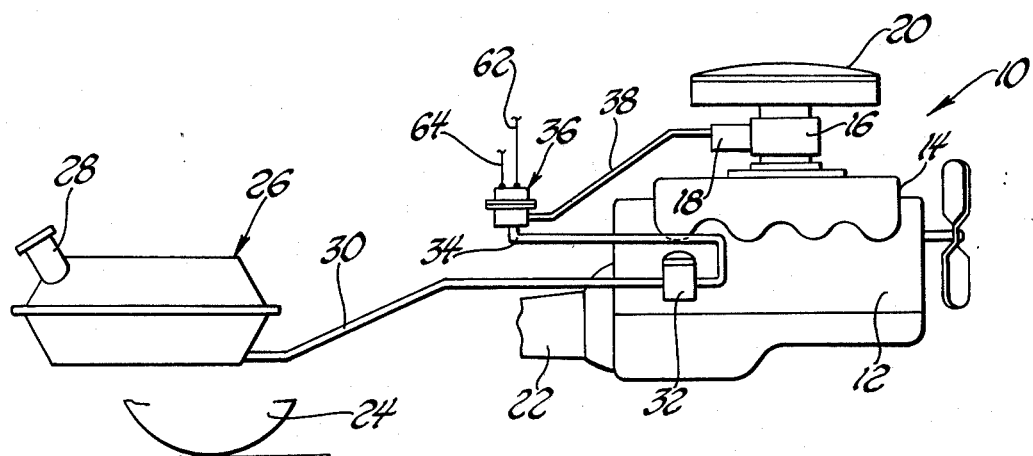
FIG. 1 is a side elevational view depicting the general arrangement of an automobile fuel system employing the teachings of the invention and associated fuel consuming engine.

Referring now in greater detail to the drawings, FIG. 1 illustrates an automotive engine 10 as being comprised of an engine block or housing 12 with an intake manifold 14 and a fuel metering device 16 situated generally thereatop. For purposes of discussion, the fuel metering device 16 may be considered to be a carburetor with an associated fuel reservoir or fuel bowl assembly 18 associated therewith. An air cleaner assembly 20 serves to filter the ambient air being supplied to the intake of the carburetor 16.

A power output transmission assembly 22 may be employed for providing power to the vehicular ground-engaging drive wheels such as fragmentarily illustrated at 24.

A fuel tank assembly 26, usually remotely situated with respect to the engine 10, is provided with a fuel filler pipe or tube 28 and has fuel supply conduit means 30 leading from the tank assembly to the inlet or intake of a related fuel pump assembly 32. The fuel pump assembly 32 may be of any type (many of which are very well known in the art) and may be driven electrically or mechanically as by a direct mechanical connection with the engine assembly 10.

The outlet or discharge of the fuel pump assembly 32 has conduit means 34, leading from there to the inlet of a valve assembly 36 which, in turn, has its outlet connected to conduit means 38 leading to the inlet of the fuel bowl assembly 18.

Generally, during normal operation, fuel supplied by tank assembly 26 to fuel pump 32 is thereby pumped through valve assembly 36 and into the fuel bowl assembly 18 which may, in turn, employ float actuated and controlled inlet valving means for assuring the admission of only that quantity of pumped fuel as is necessary to maintain a preselected desired level of fuel within such fuel bowl for desired metering characteristics and performance. It should also be mentioned that even though pump assembly 32 is illustrated as being externally of tank assembly 26, such pump assembly, as is also generally well known in the art, may in fact be located internally of the tank assembly.

Figure 2:
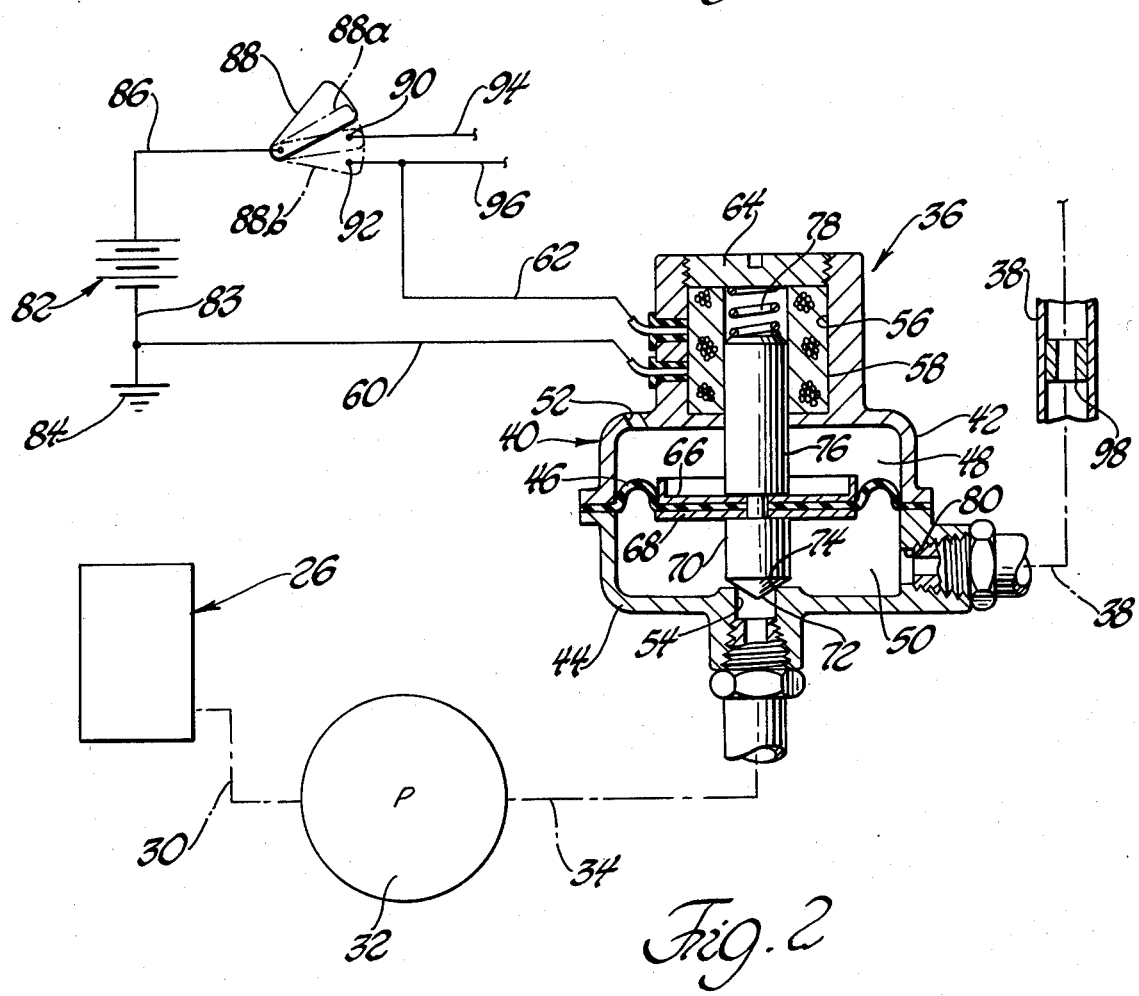
FIG. 2 is a generally axial cross-sectional view, in enlarged scale, of the valve assembly depicted in elevation in FIG. 1 along with schematically and diagrammatically illustrated attendant circuitry and elements.

Referring to FIG. 2, the valve assembly 36 is illustrated as comprising a housing or body 40 having first and second housing sections 42 and 44 which are suitably secured to each other in a manner as to generally peripherally contain and retain therebetween a diaphragm or movable wall member 46 which, in turn, generally defines at opposite sides thereof first and second distinct but variable chambers 48 and 50. As shown, chamber 48 is vented to the ambient atmosphere as by porting or conduit means 52 while chamber 50 is adapted for communication with conduit means 34 via passage or conduit portion 54.

An additional chamber 56 is formed in housing section 42 and adapted to receive therein a suitable electrical field coil assembly 58 having electrical leads or conductors 60 and 62. A suitable externally threaded nut 64 serves as a retainer for holding the coil assembly 58 in assembled relationship.

Suitable diaphragm backing plates or members 66 and 68 are suitably secured at opposite sides of diaphragm 46 and operatively have connected thereto a valving member 70, with a valve surface 72 adapted to at times cooperate with a valve seat surface 74 generally circumscribing passage 54, and armature means 76 axially movably received within field coil assembly 58. A biasing compression spring 78 serves to continuously urge armature 76 and valve member 70 in a direction tending to seat valve surface 72 against valve seat 74 to terminate or prevent flow from passage means 54 to chamber 50. As also shown, chamber 50 has outlet conduit or passage means 80 communicating with conduit means 38.

A source of electrical potential 82 is grounded at one electrical side as at 84 while its other electrical side is electrically connected, via conductor means 86, to a variably positionable electrical switch 88. The associated vehicle may have a plurality of contacts 90 and 92 selectively engagable by switch 88 with, for example, contact 90 being electrically connected as to circuitry 94 leading to the engine ignition system while contact 92 may be electrically connected, for example, to circuitry 96 leading to the electrically energizable starter motor (well known in the art) for cranking and starting the engine 10. Conductor 60 may be connected to ground reference potential as by connection with conductor 83 leading from source 82 while conductor 62 is electrically connected to conductor 96.

It can be seen that with switch 88 in the position shown, the circuits to each of contacts 90 and 92 are open as would be the case during engine shut-down. However, when switch 88 is moved to position 88b both circuits 96 and 94 are closed thereby causing the engine to undergo cranking and, at the same time, supply electrical energy to the ignition circuit means to thereby enable the engine to start and become self-sustaining. Once the engine is started, switch 88 is moved from 88b to the position shown at 88a causing the starting circuit 96 to be opened while maintaining the ignition circuit 94 closed.

Operation of Invention

Assuming first a condition of engine shut-down, switch 88 will be in an open condition and spring 78 will urge valve member 70 downwardly causing valve surface 72 to close against valve seat 74.

When the associated engine 10 is to be cranked and started, switch 88 is moved to position 88b thereby closing circuits 94 and 96 as well as the circuit through conductor 62, coil assembly 58 and conductor 60. Energization of coil assembly 58 causes armature 76 to move upwardly against the resilient resistance of spring 78 thereby moving valve surface 72 away from valve seat 74. Pump assembly 32 is thusly permitted to pump fuel through conduit means 54 into chamber 50 and out through conduit portion 80 into conduit means 38 to the fuel reservoir assembly 18.

When sufficient cranking has been achieved and the engine has become self-sustaining, switch 88 is moved from position 88b to position 88a thereby de-energizing field coil assembly or solenoid means 58. At this time, even though spring 78 resiliently urges valve member 70 into closed position against seat 74, the pressure of the fuel within chamber 50 is sufficient, when thusly applied against the relatively large effective area of diaphragm 46, to overcome such resilient urging by spring 78 thereby continuing to hold valve 70 open even though coil assembly 58 is de-energized. In order to assure proper fuel pressure increase in chamber 50, it is also contemplated that restriction means, such as at 98 may be provided generally downstream of the chamber 50. In fact, if such restrictive effect is desired, passage means 80 may itself be thusly calibrated or, in the alternative, contain therein separate inserted restriction means.

Usually in the event that a vehicle experiences a high order impact, as might occur in a crash, or rolls over or actually attains or comes to rest in a physical attitude (because of a high order impact) wherein the fuel reservoir 18 is at an elevation below that of the fuel tank assembly, the engine, because of the disruption to the normal metered rate of fuel flow, has become shut-down. Consequently, as soon as the engine is thusly shut-down, the fuel pressure supplied by pump 32 rapidly decreases and such decrease in fuel pressure within chamber 50 then becomes insufficient to maintain valve 70 open against the resilient force of spring 78. The result of this is that spring 78 moves valve 70 downwardly until valve surface 72 closes against seat 74 and thereby terminates further fuel flow into chamber 50 from tank 26 and pump 32 regardless of the static pressure head of the fuel upstream of valve member 70.

The valving assembly 36 may, of course, be situated in any suitable location on the associated vehicle. However, generally, the closer that such valve assembly 36 is located to the point or points of discharge of fuel to the engine 10, the better the overall results would be because if any fuel line between the valve assembly 36 and the engine 10 would have a tendency to drain, the volume of such fuel available to so drain would be minimized.

Although only a preferred embodiment of the invention has been disclosed and described, it is apparent that other embodiments and modifications of the invention are possible within the scope of the appended claims.

I claim:

1. In a vehicle having a fuel consuming engine, the combination comprising fuel tank means, fuel metering means for metering the rate of flow of said fuel to said engine, fuel pump means effective for supplying a flow of said fuel from said fuel tank means to said fuel metering means, a starter motor, an electrical ignition circuit including a starter motor cranking circuit, and safety valving means effective for at times preventing a flow of said fuel from said fuel tank means to said fuel metering means, said safety valving including electrical means for initially opening the same during engine cranking only and not when only the ignition circuit is closed, as when said engine is running.

2. The combination according to claim 1 wherein said valving means is situated as to be generally downstream of said fuel pump means and generally upstream of said fuel metering means.

3. The combination according to claim 1 wherein said fuel pump means is situated externally of said fuel tank means.

4. The combination according to claim 1 wherein said fuel pump means is situated externally of said fuel tank means, and wherein said valving means is situated as to be generally downstream of said fuel pump means and generally upstream of said fuel metering means.

5. The combination according to claim 1 wherein said fuel metering means comprises carburetor means, wherein said carburetor means comprises fuel bowl means, and wherein said valving means is situated upstream of said fuel bowl means.

6. The combination according to claim 1 wherein said safety valving means comprises housing means, said housing means comprising chamber means, movable wall means defining at least a portion of said chamber means, fuel inlet means formed in said housing means effective for communicating with said chamber means, fuel outlet means formed in said housing means communicating with said chamber means, valve member means situated generally in said chamber means and operatively connected to said movable wall means, biasing means normally urging said valve member means toward a closed position as to thereby terminate communication as between said inlet means and said chamber means, and electrically energizable means operatively connected to said valve member means, said electrically energizable means being effective to at times cause said valve member means to move to an open position as to thereby initially complete communication as between said inlet means and said chamber means.

7. The combination according to claim 6 wherein said movable wall comprises a pressure responsive diaphragm.

8. The combination according to claim 6 wherein said biasing means comprises spring means.

9. The combination according to claim 6 wherein said movable wall means comprises pressure responsive diaphragm means, wherein said biasing means comprises spring means, and wherein said electrically energizable means comprises solenoid means, said solenoid means comprising electrical coil means and armature means, and wherein said armature means is operatively connected to said valve member means.

10. The combination according to claim 9 and further comprising electrical conductor means electrically interconnecting said electrical coil means to related electrical starting circuit means of said vehicle whereby energization of said starting circuit means also causes energization of said electrical coil means.

11. The combination according to claim 1 wherein said safety valving means is situated as to be generally downstream of said fuel pump means and generally upstream of said fuel metering means, wherein said safety valving means comprises housing means, said housing means comprising chamber means, movable wall means defining at least a portion of said chamber means, fuel inlet means formed in said housing means effective for communicating with said chamber means, fuel outlet means formed in said housing means communicating with said chamber means, valve member means situated generally in said chamber means and operatively connected to said movable wall means, biasing means normally urging said valve member means toward a closed position as to thereby terminate communication as between said inlet means and said chamber means, and electrically energizable means operatively connected to said valve member means, said electrically energizable means being effective to at times cause said valve member means to move to an open position as to thereby initially complete communication as between said inlet means and said chamber means, said movable wall upon completion of communication between said inlet means and said chamber means being exposed to the discharge pressure of said fuel pump means as to thereby hold said valve member means in said open position against the urging of said biasing means for so long as said pressure exists.

12. The combination according to claim 11 wherein said fuel metering means comprises fuel reservoir means, and further comprising auxiliary calibrated restriction means situated generally upstream of said fuel reservoir means and generally downstream of said chamber means.

* * * * *